US008751817B2

(12) United States Patent
Kato

(10) Patent No.: US 8,751,817 B2
(45) Date of Patent: Jun. 10, 2014

(54) DATA PROCESSING APPARATUS AND VALIDITY VERIFICATION METHOD

(71) Applicant: Kei Kato, Kanagawa (JP)

(72) Inventor: Kei Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 99 days.

(21) Appl. No.: 13/632,354

(22) Filed: Oct. 1, 2012

(65) Prior Publication Data

US 2013/0091394 A1 Apr. 11, 2013

(30) Foreign Application Priority Data

Oct. 7, 2011 (JP) ................... 2011-222617

(51) Int. Cl.
G06F 11/30 (2006.01)
(52) U.S. Cl.
USPC .......................................... 713/187
(58) Field of Classification Search
USPC .................. 713/2, 180, 187, 193; 726/22, 30; 714/719, E11.175
See application file for complete search history.

(56) References Cited

U.S. PATENT DOCUMENTS

| 7,020,716 | B2 * | 3/2006 | Raval et al. | 709/237 |
| 7,992,110 | B1 * | 8/2011 | Yuan et al. | 716/103 |
| 8,000,493 | B2 * | 8/2011 | Chen | 382/100 |
| 8,191,166 | B2 * | 5/2012 | Carr | 726/31 |
| 8,627,053 | B2 * | 1/2014 | Mittal | 713/2 |
| 2005/0182952 | A1 | 8/2005 | Shinozaki | |
| 2007/0083768 | A1 | 4/2007 | Isogai et al. | |
| 2007/0226518 | A1 | 9/2007 | Yasaki et al. | |
| 2009/0132829 | A1 | 5/2009 | Ohhashi | |
| 2012/0005640 | A1 * | 1/2012 | Mehta | 716/106 |

FOREIGN PATENT DOCUMENTS

| JP | 2005-227995 | 8/2005 |
| JP | 2007-133860 | 5/2007 |
| JP | 2007-257197 | 10/2007 |
| JP | 2009-129061 | 6/2009 |

* cited by examiner

Primary Examiner — Beemnet Dada
(74) Attorney, Agent, or Firm — IPUSA, PLLC

(57) ABSTRACT

A data processing apparatus includes a ROM (Read Only Memory) having a validity verification program stored therein, an auxiliary storage device including a plurality of storage areas having a plurality of target verification data stored therein, an execution unit configured to perform a validity verification process on the plural target verification data in accordance with the validity verification program. An order of priority is assigned to the plural target verification data. The plural storage areas have addresses that is recognizable by the execution unit. The execution unit is configured to determine validity of each of the plural target verification data based on the order of priority until one of the plural target verification data is determined to be valid.

11 Claims, 11 Drawing Sheets

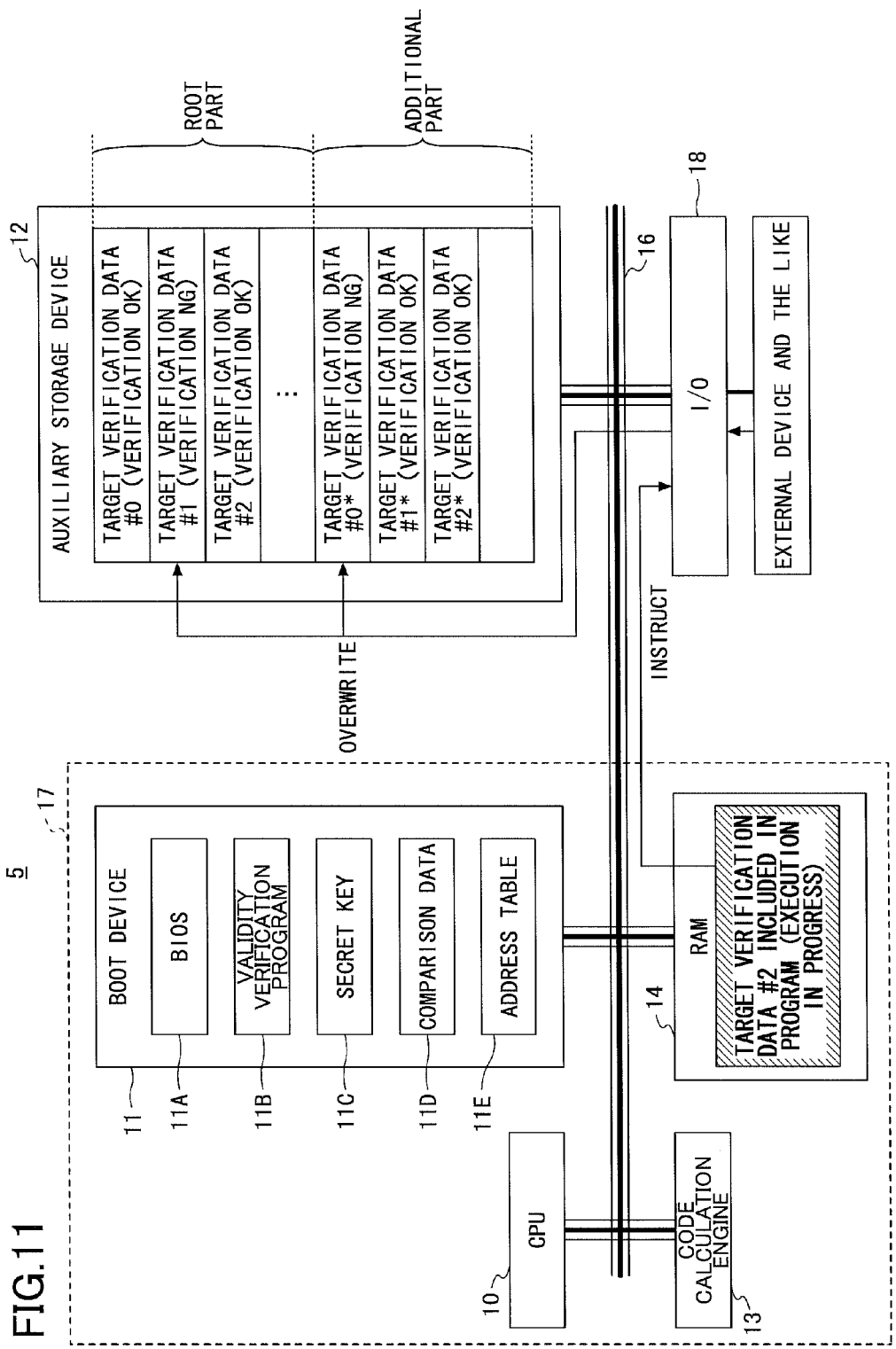

DATA PROCESSING APPARATUS AND VALIDITY VERIFICATION METHOD

BACKGROUND OF THE INVENTION

1. Field of the Invention

The present invention relates to a data processing apparatus and a validity verification method for maintaining security upon activation and the like.

2. Description of the Related Art

With conventional computers, server devices, and other data processing apparatuses that are attached to personal computers (PC), electronic devices, and electrical devices, there is performed a process of determining whether data of, for example, a program stored in an auxiliary storage device has been tampered with or destroyed. This process, which is referred to as validity verification, is executed, for example, when the data processing apparatus is activated.

FIG. 1 is a schematic diagram illustrating a configuration of a personal computer according to a related art example. As illustrated in FIG. 1, the personal computer includes, for example, a CPU (Central Processing Unit), a boot device, an auxiliary storage device, a TPM (Trusted Platform Module), a code calculation engine, and a RAM (Random Access Memory) that are connected to each other by a bus.

The boot device is, for example, a flash ROM (Read Only Memory). The boot device stores programs (e.g., BIOS (Basic Input/Output System), a program for verifying validity) that are executed, for example, when the personal computer is activated. The auxiliary storage device is, for example, a HDD (Hard Disk Drive), a flash memory, or an EEPROM (Electrically Erasable and Programmable Read Only Memory). The auxiliary storage device stores, for example, an operating system, various application programs, and databases. The TPM is a security chip that is resistant against, for example, tampering of stored data. The TPM can store or generate, for example, key data used for code calculation and comparison data used for validity verification. The TPM can rewrite the stored/generated key data by performing predetermined procedures. The code calculation engine is a calculation unit that performs code (cipher) calculation such as RSA encryption calculation or hash calculation. The TPM may include the function(s) of the code calculation engine.

For example, in performing the validity verification using the personal computer illustrated in FIG. 1, target verification data (e.g., program, data) stored in the auxiliary storage device is copied to the RAM. Then, the code calculation engine performs code calculation on the target verification data by using key data. Then, the calculation result of code calculation by the code calculation engine is compared with comparison data. In a case where the calculation result matches the comparison data, it is determined that the target verification data is valid (normal). In the case where the target verification data is valid, the operating system of the personal computer is activated and proceeds to a normal operating status.

In a case where a problem occurs in a program used for validity verification in the personal computer of the related art example, this problem can be addressed by rewriting the program because the boot device and the TPM are both rewritable devices. Thus, there is an advantage that processes related to validity verification and other processes not related to validity verification can be written relatively freely with the boot device and the TPM.

Further, various documents are disclosed in relation to the above-described validity verification technology. For example, Japanese Laid-Open Patent Application 2009-129061 describes a data processing apparatus that performs validity verification by calculating a hash value of an activation target (e.g., program) and then comparing the calculated hash value with a hash value stored beforehand.

However, with the personal computer of the related art example, the use of rewritable devices such as the boot device and the TPM makes cost-reduction and size-reduction difficult. In addition, a rewritable device (e.g., flash ROM, TPM), is not mounted on integration technology devices such as SoC (System-on-a-Chip) and ASIC (Application Specific Integrate Circuit).

In a case where the above-described rewritable device of a data processing apparatus is replaced with a mask ROM. or the like, operation of the data processing apparatus becomes complicated when target verification data is determined to be invalid. This may lead to degradation of usability (convenience) of the data processing apparatus.

SUMMARY OF THE INVENTION

The present invention may provide a data processing apparatus and a validity verification method that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a data processing apparatus and a validity verification method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data processing apparatus including: a ROM (Read Only Memory) having a validity verification program stored therein; an auxiliary storage device including a plurality of storage areas having a plurality of target verification data stored therein; an execution unit configured to perform a validity verification process on the plural target verification data in accordance with the validity verification program; wherein an order of priority is assigned to the plural target verification data, wherein the plural storage areas have addresses that is recognizable by the execution unit, wherein the execution unit is configured to determine validity of each of the plural target verification data based on the order of priority until one of the plural target verification data is determined to be valid.

Other objects, features and advantages of the present invention will become more apparent from the following detailed description when read in conjunction with the accompanying drawings.

BRIEF DESCRIPTION OF THE DRAWINGS

FIG. 11 is a schematic diagram for describing a program included in a target verification data #2 being loaded in a RAM and executed according to an embodiment of the present invention.

DETAILED DESCRIPTION OF THE PREFERRED EMBODIMENTS

In the following, embodiments of the present invention will be described with reference to the accompanying drawings.
<First Embodiment>
[Configuration]

Figure 1:
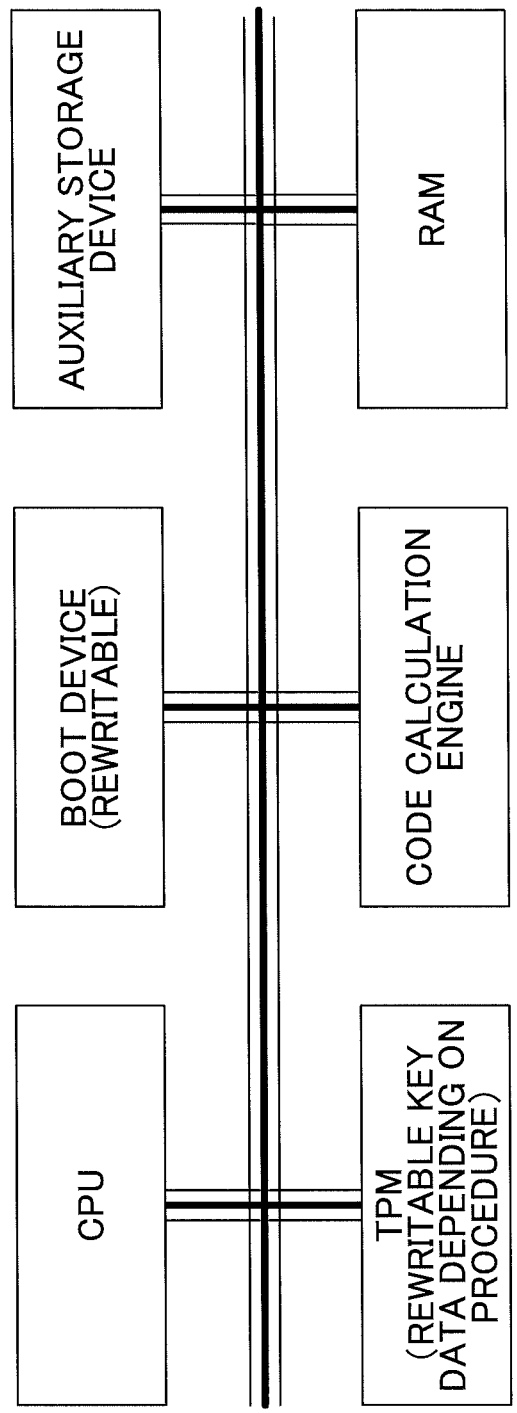
FIG. 1 is a schematic diagram illustrating a configuration of a personal computer according to a related art example.
Figure 2:
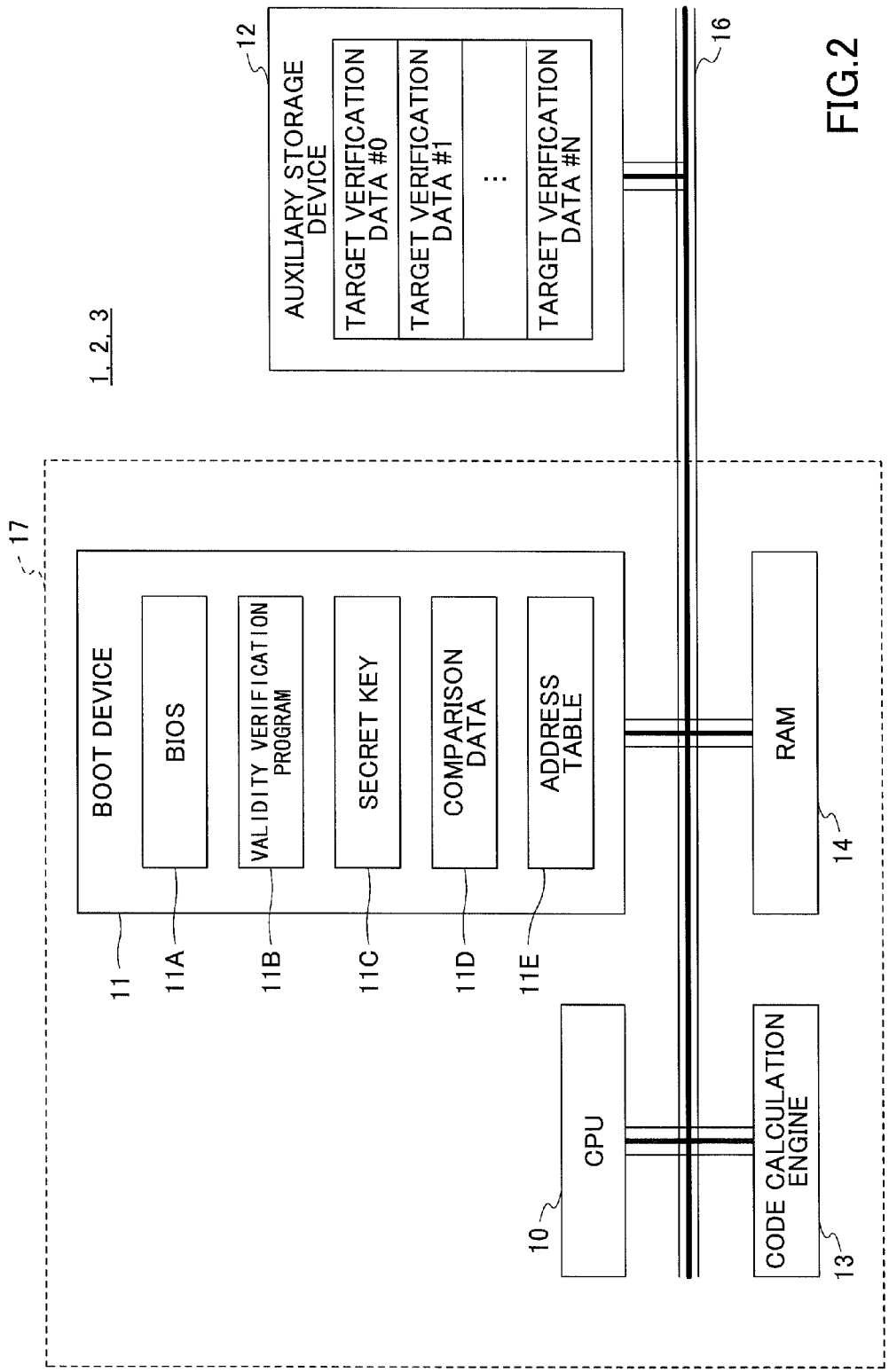
FIG. 2 is an example illustrating a system configuration of a data processing apparatus according to a first embodiment of the present invention.

FIG. 2 is an example illustrating a system configuration of a data processing apparatus 1 according to a first embodiment of the present invention. The data processing apparatus 1 includes, for example, a CPU (Central Processing Unit) 10, a boot device 11, an auxiliary storage device 12, a code calculation engine 13, and a RAM (Random Access Memory) 14 that are connected by a bus 16.

Among the elements of the data processing apparatus 1, it is preferable for the CPU 10, the boot device 11, the code calculation engine 13, and the RAM 14 to be configured as an SoC (System-on-a-Chip) 17. Accordingly, the entire chip area of the data processing apparatus 1 and the size of the data processing apparatus 1 can be reduced. In view of the large demands for size reduction, this advantage is particularly significant in a case where the data processing apparatus 1 is a built-in type computer built into an electronic device or an electric device. Alternatively, the data processing apparatus 1 may use an ASIC (Application Specific Integrated Circuit) instead of the SoC 17.

The data processing apparatus 1 may also include other elements/components of a typical data processing apparatus such as a display device, a speaker, a mouse, a keyboard, a touchpad, and/or an interface for connecting to a network (same for the below-described data processing apparatuses 2, 3, 4, 5 according to the second-fifth embodiments and modified examples of the present invention).

The CPU 10 is a processor including, for example, a program counter, an instruction decoder, various computing units (operators), an LSU (Load Storage Unit), and a general-purpose register. The CPU 10 may be used as an execution unit for executing various processes including the validity verification process in accordance with, for example, a program stored in the boot device 11.

The boot device 11 is, for example, a mask ROM (Read Only Memory) having data and programs such as a BIOS (Basic Input Output System) 11A, a validity verification program 11B, a secret key 11C, and comparison data 11D, and an address table 11E stored therein. The data and programs stored in the boot device 11 are excluded from the target verification data because the boot device 11 is a storage device that cannot rewrite data and programs. Alternatively, the locations in which the secret key 11C, the comparison data 11D, and the address table 11E are stored may be, for example, a ROM that is separate from the boot device 11.

The auxiliary storage device 12 is a non-volatile memory that can read and write data. The auxiliary storage device 12 may be, for example, a HDD (Hard Disk Drive), a flash memory, or an EEPROM (Electrically Erasable Programmable Read Only Memory). The auxiliary storage device 12 has, for example, target verification data #0, #1, . . . #N stored therein. It is to be noted that the number following "#" of the target verification data indicates an order of priority assigned to each of the target verification data. "N" is an given integer that is greater than or equal to 1. For example, the target verification data are arranged in accordance with the order of priority. The auxiliary storage device 12 includes storage areas in which the target verification data are stored. The storage areas of the auxiliary storage device may have physical addresses that correspond to the arrangement of the plural target verification data. For example, the target verification data may be arranged in a manner that the start address of the target verification data #0 is 00100000, the start address of the target verification data #1 is 00200000, and the start address of the target verification data #2 is 00300000, . . . . This facilitates processes (e.g., reading) performed on the target verification data by the CPU 10 because the target verification data can be recognized by the addresses of the storage areas of the auxiliary storage device 12. Thereby, the time of activating the data processing apparatus 1 can be reduced.

In this embodiment, the target verification data #0 has the highest order of priority among the target verification data stored in the auxiliary storage device 12. The target verification data #0 includes data pertaining to, for example, the operating system, application programs, and databases. The target verification data #1 (subordinate target verification data compared to target verification data #0) which has a lower order of priority than the target verification data (superordinate target verification data compared to target verification data #1) #0 includes, for example, a recovery program of the target verification data #0. Further, target verification data #2, #3, . . . (subordinate target verification data compared to target verification data #0 and #1) which have a lower order of priority than the target verification data #0 includes, for example, a recovery program of the target verification data #1 as well as other data. The content of the data stored in the target verification data is not limited to those described above. For example, programs or data of the same content may be stored in each of the target verification data.

The start and the end addresses of each of the target verification data are stored in the address table 11E. The validity verification program 11B (by way of the CPU 10) can recognize the start and the end addresses of the target verification data as fixed values. Alternatively, the start and the end addresses of each of the target verification data may be directly written in the codes of the validity verification program 11B.

The code calculation engine 13 is a computing unit for performing code calculation such as RSA code calculation or hash calculation. The code calculation of the code calculation engine 13 is performed by using the secret key 11C and a validity verification signature key (not illustrated). The code calculation engine 13 may also be used as a part of the execution unit for executing the validity verification process in accordance with, for example, a program stored in the boot device 11.

The RAM 14 is used as a work area for performing validity verification. In addition, the RAM 14 is used as a main storage device after the data processing apparatus 1 has shifted to a regular operation state.

[Procedure of Validity Verification]

The data processing apparatus 1 according to an embodiment of the present invention performs validity verification when, for example, the data processing apparatus 1 is activated (including when power of the data processing apparatus 1 is turned on, when the data processing apparatus 1 is restarted). In this embodiment, the validity verification performed by the data processing apparatus 1 is for verifying whether the target verification data 12#0-12#N has been, for example, tampered with or destroyed. There is no specific condition (restriction) regarding the timing for performing the validity verification. Thus, the timing for performing the validity verification may be decided arbitrarily. Next, the procedure of validity verification according to an embodiment of the present invention is described.

Figure 3:
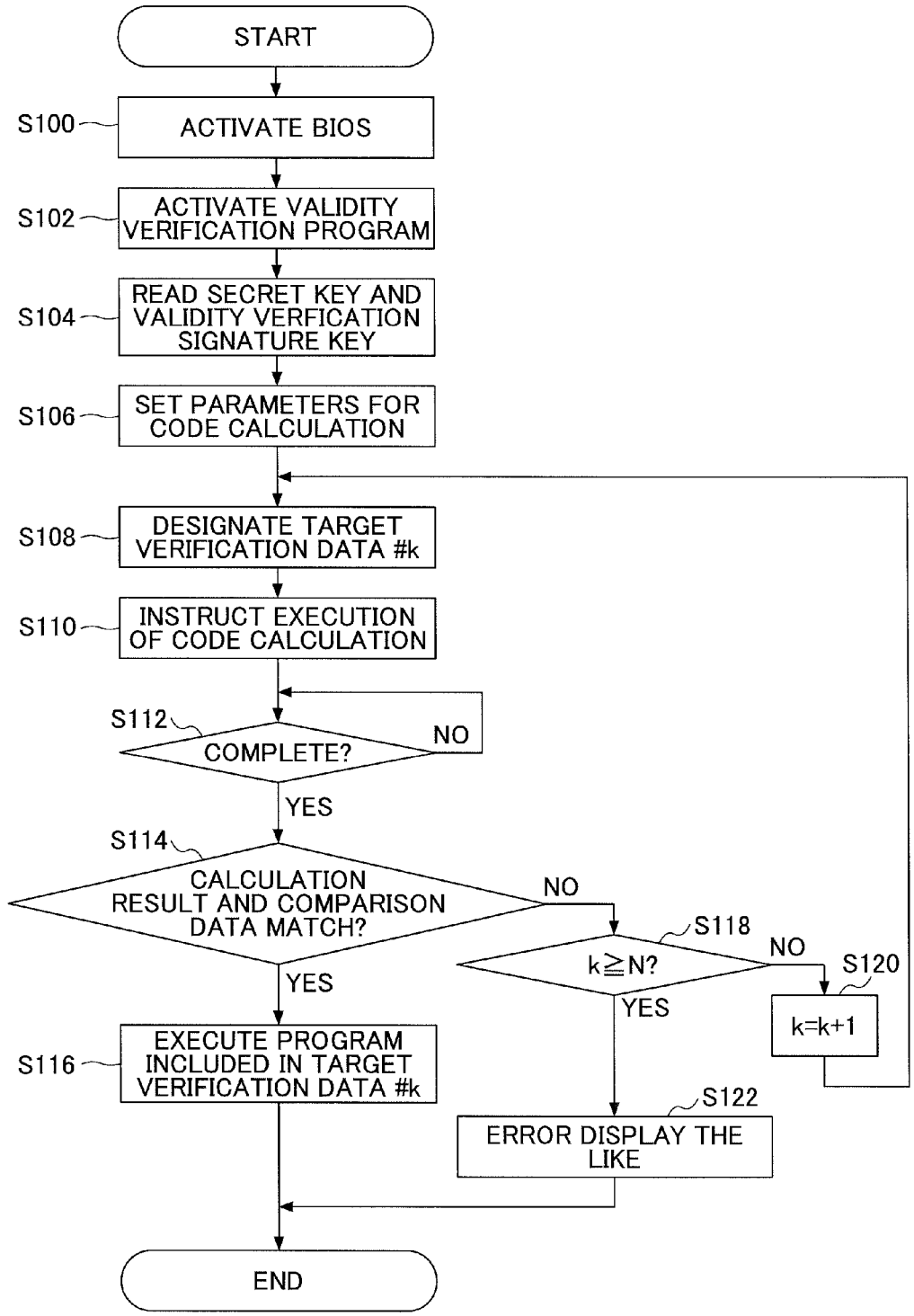
FIG. 3 is a flowchart illustrating the flow of an operation performed in a case of activating the data processing apparatus according to the first embodiment of the present invention.

FIG. 3 is a flowchart illustrating the flow of an operation performed in a case of activating the data processing apparatus 1 according to an embodiment of the present invention.

First, the BIOS 11A is activated when the data processing apparatus 1 is activated (Step S100).

Then, the validity verification program 11B is activated (Step S102). Then, the validity verification program 11B reads the secret key 11C and the validity verification signature key (not illustrated) (Step S104). Then, the validity verification program 11B combines the secret key 11C and the validity verification signature key and sets parameters for code calculation (Step S106).

Then, the validity verification program 11B designates target verification data #k (Step S108) and instructs the code calculation engine 13 to calculate, for example, a hash value corresponding to the target verification data #k in accordance with the parameters set in Step S106 (Step S110). The letter "k" represents a parameter that increases from 0 to N in correspondence with the number of times of performing a loop in the flow illustrated in FIG. 3. A value "0" is set as the initial value of "k". The code calculation engine 13 performs code calculation on the designated target verification data #k in accordance with the validity verification program 11B.

In a case where the calculation by the code calculation engine 13 is completed (Yes in Step S112), the validity verification program 11B determines whether the calculation result of the code calculation engine 13 and the comparison data 11D match (Step S114).

In a case where the calculation result of the code calculation engine 13 and the comparison data 11D match (Yes in Step S114), the program included in the target verification data #k is executed (Step S116).

In a case where the calculation result of the code calculation engine 13 and the comparison data 11D do not match (No in Step S114), it is determined whether the parameter k is greater than or equal to N (Step S118). In a case where the parameter k is less than N (No in Step S118), the parameter k is incremented by 1 (i.e. k+1) (Step S120). Then, the operation returns to Step S108.

In Step S116, if the target verification data #k designated in Step S108 is target verification data #0, the operation system or application program included in the target verification data #0 is activated, and the data processing apparatus 1 proceeds to a regular operation state.

Further, in a case where the target verification data #k is target verification data #1 or after (below), recovery or the like of the target verification data #0 is performed. After recovery or the like of the target verification data #0 is performed, the operation system or application program included in the target verification data #0 is activated, and the data processing apparatus 1 proceeds to a regular operation state.

As described above, in a case where subordinate (subsequent) target verification data (#1, #2, . . . ) includes a program or data that are the same as those of the target verification data #0, verification is to be performed on target verification data #k+1 if the target verification data #k is invalid. This process is repeated until valid target verification data is found.

Further, if valid target verification data is found in a case where subordinate target verification data (#1, #2, . . . ) includes a program or data that are the same as those of the target verification data #0 or a recovery program of the target verification data #0, the operating system or application program is activated in addition to executing the recovery program of the target verification data #0 in the background.

That is, if any of the target verification data is valid, the data processing apparatus 1 proceeds to the regular operation state.

Therefore, the usability of the data processing apparatus 1 can be improved because the data processing apparatus 1 can automatically proceed to the regular operation state in any of the above-described cases. Further, the target verification data can easily adapt to changes of the target verification data corresponding to, for example, upgrades of software or the like because the target verification data is stored in a readable/writable auxiliary storage device 12. Thus, the usability of the data processing apparatus 1 can be improved.

In a case where the parameter k is determined to be greater than or equal to N (Yes in Step S118), an error process such as error display is performed (Step S122). Then, the flow of FIG. 3 is terminated.

With the data processing apparatus 1 according to the above-described embodiment of the present invention, even in a case where one of the target verification data is tampered with or damaged and is determined to be invalid, the data processing apparatus 1 can automatically proceed to its regular operation state as long as other target verification data that are subordinate to the one of the target verification data (i.e. target verification data determined to be invalid) are valid. Accordingly, the usability of the data processing apparatus 1 can be improved.

Further, the main components included the data processing apparatus 1 other than the auxiliary storage device 12 (i.e. the CPU 10, the boot device 11, the code calculation engine 13, the RAM 14) do not include a rewritable storage device (e.g., flash memory, TPM), so that the CPU 10, the boot device 11, the code calculation engine 13, and the RAM 14 can be easily configured to constitute a SoC or an ASIC. Therefore, size reduction and cost reduction of the data processing apparatus 1 can be achieved.

Hence, with the data processing apparatus 1 according to the above-described embodiment of the present invention, cost reduction and size reduction can be achieved without degrading usability.

<Second Embodiment>

Next, a data processing apparatus 2 according to a second embodiment of the present invention is described with reference to the drawings.

[Configuration]

The data processing apparatus 2 of the second embodiment basically includes the same components (having the same functions) as those of the data processing apparatus 1 of the first embodiment. Thus, in the data processing apparatus 2 of the second embodiment, like components/elements are denoted by like reference numerals as those of the data processing apparatus 1 of the first embodiment and are not further explained.

The data processing apparatus 2 is different from the data processing apparatus 1 in that the data processing apparatus 2 (particularly, the CPU 10 and the validity verification code program 11B) is configured to perform code calculation on each of the target verification data by copying the target verification data from the auxiliary storage device 12 into the RAM 14 and performing code calculation on the copied target verification data.

Accordingly, by performing code calculation on the target verification data stored in the RAM 14 (which can be accessed at high speed), a validity verification process can be rapidly performed.

[Procedure of Validity Verification]

Figure 4:
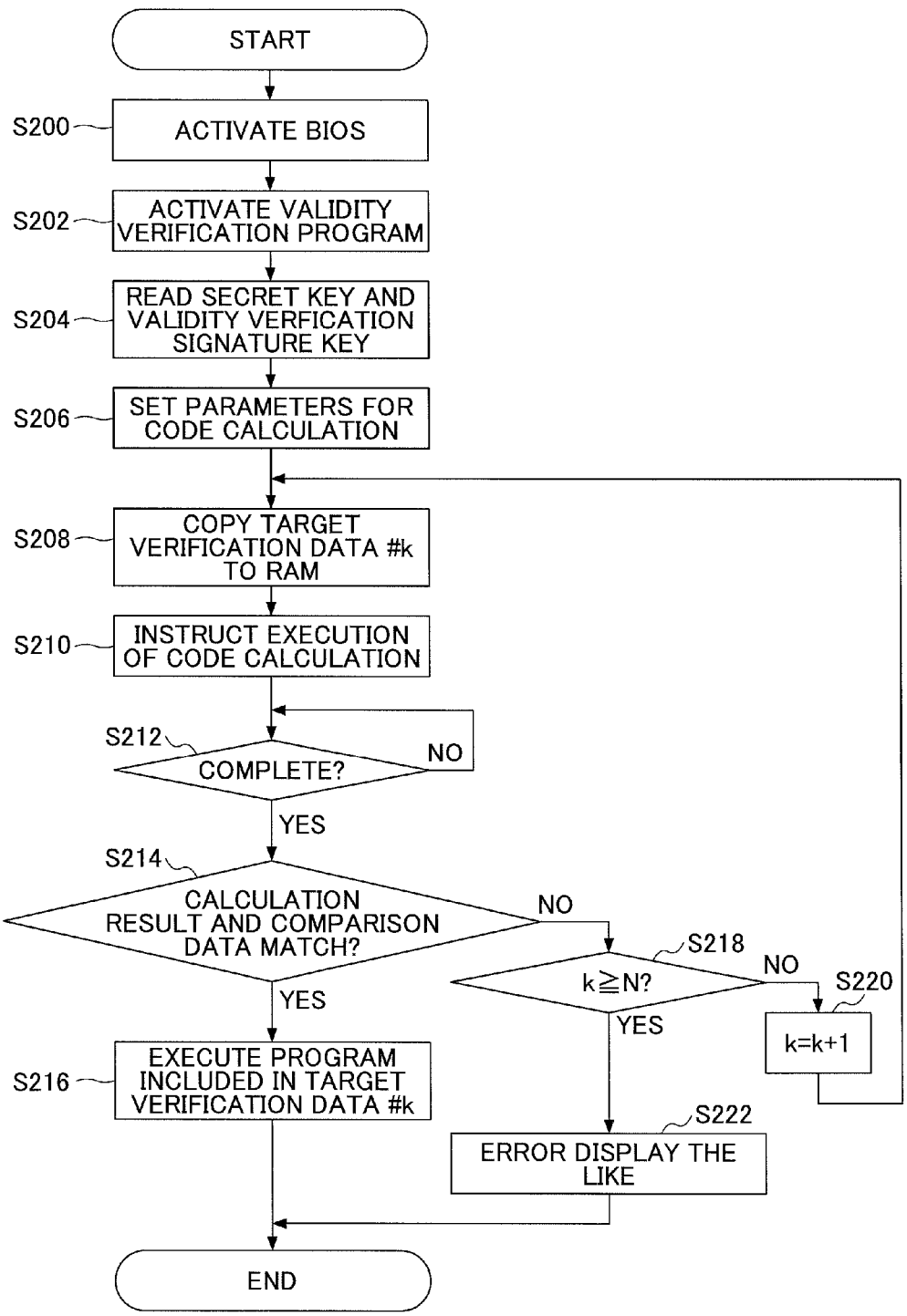
FIG. 4 is a flowchart illustrating the flow of an operation performed in a case of activating a data processing apparatus according to a second embodiment of the present invention.

FIG. 4 is a flowchart illustrating the flow of an operation performed in a case of activating the data processing apparatus 2 according to an embodiment of the present invention.

First, the BIOS 11A is activated when the data processing apparatus 2 is activated (Step S200).

Then, the validity verification program 11B is activated (Step S202). Then, the validity verification program 11B reads the secret key 11C and a validity verification signature key (not illustrated) (Step S204). Then, the validity verification program 11B combines the secret key 11C and the validity verification signature key and sets parameters for code calculation (Step S206).

Then, the validity verification program 11B copies the target verification data #k into the RAM 14 (Step S208). The letter "k" represents a parameter that increases from 0 to N in correspondence with the number of times of performing a loop in the flow illustrated in FIG. 3. A value "0" is set as the initial value of "k". Alternatively, the copying process may be instructed to a DMA (Direct Memory Access) controller (not illustrated) instead of, for example, the CPU 10.

Then, the validity verification program 11B instructs the code calculation engine 13 to calculate, for example, a hash value corresponding to the target verification data #k in accordance with the parameters set in Step S206 (Step S210). Accordingly, the code calculation engine 13 performs code calculation on the copied target verification data #k.

The RAM 14 can be accessed faster than the auxiliary storage device 12. Therefore, because the above-described steps are performed by accessing the RAM 14, validity verification can be rapidly performed.

After calculation of, for example, the hash value is completed by the code calculation engine 13, the validity verification program 11B determines whether the calculation result of the code calculation engine 13 and the comparison data 11D match (Step S214).

In a case where the calculation result of the code calculation engine 13 and the comparison data 11D match (Yes in Step S214), the CPU 12 executes the program included in the target verification data #k copied into the RAM 14 in Step S208 (Step S216).

In a case where the calculation result of the code calculation engine 13 and the comparison data 11D do not match (No in Step S214), it is determined whether the parameter k is greater than or equal to N (Step S218). In a case where the parameter k is less than N (Yes in Step S218), the parameter k is incremented by 1 (i.e. k+1) (Step S220). Then, the operation returns to Step S208.

If the target verification data #k copied into the RAM 14 in Step S208 is target verification data #0, the operation system or application program included in the target verification data #0 is activated, and the data processing apparatus 1 proceeds to a regular operation state.

Further, in a case where the target verification data #k copied into the RAM 14 is target verification data #1 or after (below), recovery or the like of the target verification data #0 is performed. After recovery or the like of the target verification data #0 is performed, the operating system or application program included in the target verification data #0 is activated, and the data processing apparatus 1 proceeds to a regular operation state.

As described above, in a case where subordinate (subsequent) target verification data (#1, #2, . . . ) includes a program or data that are the same as those of the target verification data #0, verification is to be performed on target verification data #k+1 if the target verification data #k is invalid. This process is repeated until valid target verification data is found.

Further, if valid target verification data is found in a case where the subordinate target verification data (#1, #2, . . . ) includes a program or data that are the same as those of the target verification data #0 or a recovery program of the target verification data #0, the operating system or application program is activated in addition to executing the recovery program of the target verification data #0 in the background.

That is, if any of the target verification data is valid, the data processing apparatus 1 proceeds to the regular operation state.

Therefore, the usability of the data processing apparatus 2 can be improved because the data processing apparatus 2 can automatically proceed to the regular operation state in any of the above-described cases. Further, the target verification data can easily adapt to changes of the target verification data corresponding to, for example, upgrades of software or the like because the target verification data is stored in a readable/writable auxiliary storage device 12. Thus, the usability of the data processing apparatus 2 can be improved.

In a case where the parameter k is determined to be greater than or equal to N (Yes in Step S218), an error process such as an error display is performed (Step S222). Then, the flow of FIG. 4 is terminated.

Hence, the data processing apparatus 2 according to the above-described embodiment of the present invention can attain the same advantages as those of the data processing apparatus 1. In addition, the data processing apparatus 2 according to the above-described embodiment of the present invention can rapidly perform validity verification because target verification data is copied into the RAM 14 and code calculation is performed on the target verification data copied into the RAM 14.

<Third Embodiment>

Next, a data processing apparatus 3 according to a third embodiment of the present invention is described with reference to the drawings.

[Configuratio]

The data processing apparatus 3 of the third embodiment basically includes the same components (having the same functions) as those of the data processing apparatus 1 of the first embodiment. Thus, in the data processing apparatus 3 of the third embodiment, like components/elements are denoted by like reference numerals as those of the data processing apparatus 1 of the first embodiment and are not further explained.

The data processing apparatus 3 is different from the data processing apparatus 1 in that the data processing apparatus 3 (particularly, the CPU 10 and the validity verification code program 11B) is configured to perform code calculation on target verification data by copying target verification data from the auxiliary storage device 12 into the RAM 14 and performing code calculation on the copied target verification data in a case where the target verification data is target verification #0, and directly performing code calculation on target verification data stored in the auxiliary storage device 12 in a case where the target verification data is target verification data #1 or after (below).

Accordingly, code calculation can be rapidly performed on target verification data #0 stored in the RAM 14 which can be accessed at high speed. Accordingly, processing can be performed more rapidly.

Further, with respect to target verification data #1 or after, designing of programs and the like can be freely performed without having to consider storage space of the RAM 14. As described above, there may be a case where a recovery program or the like of target verification data #0 is stored in the target verification data #1 or after. In such a case, the recovery program or the like of the target verification data #0 may have a data size greater than that of a target program itself. Therefore, by copying target verification data from the auxiliary storage device 12 into the RAM 14 and performing code calculation on the copied target verification data in a case where the target verification data is target verification #0, and directly performing code calculation on target verification data stored in the auxiliary storage device 12 in a case where the target verification data is target verification data #1 or after (below), program design can be performed more flexibly.

[Procedure of Validity Verification]

Figure 5:
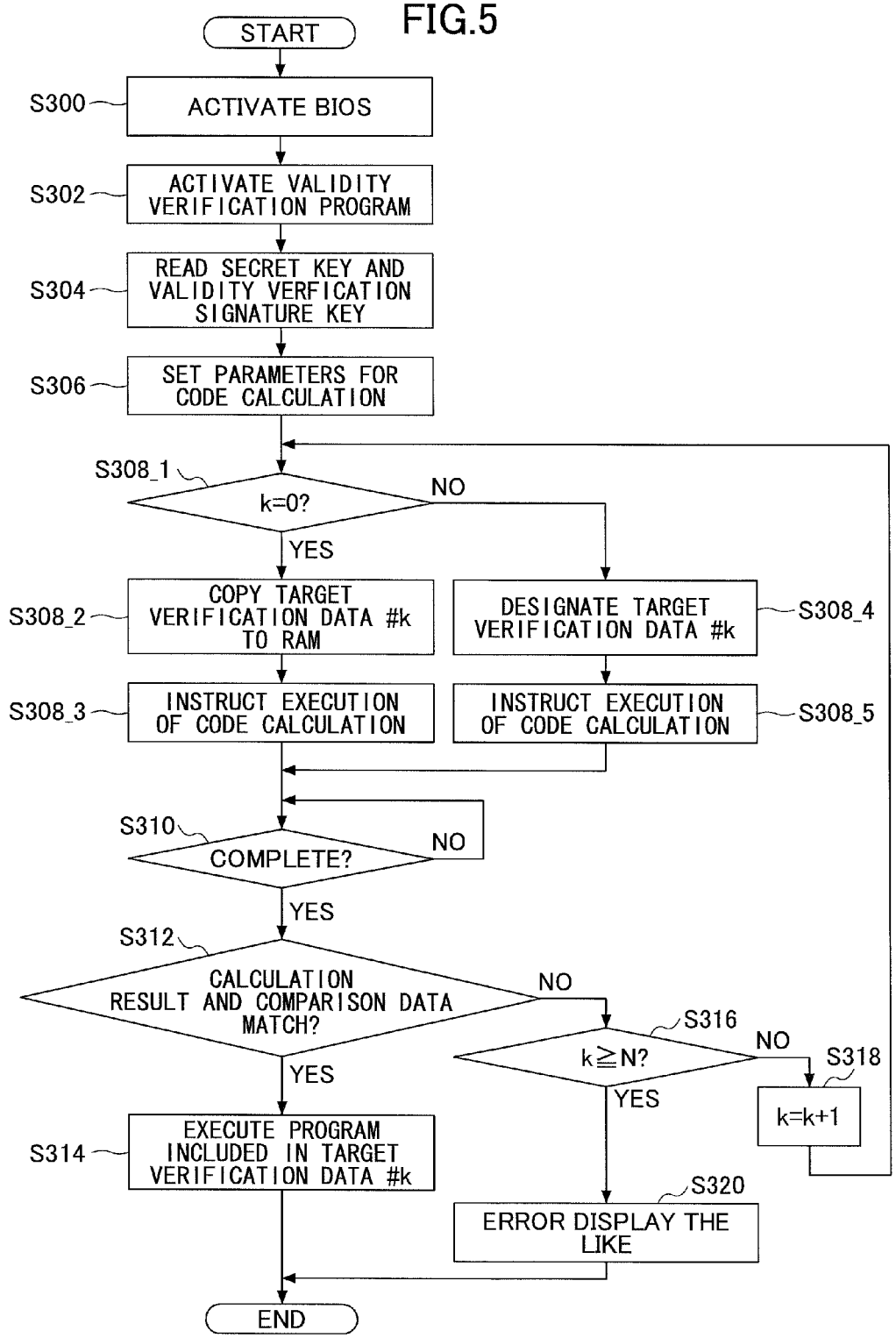
FIG. 5 is a flowchart illustrating the flow of an operation performed in a case of activating a data processing apparatus according to a third embodiment of the present invention.

FIG. 5 is a flowchart illustrating the flow of an operation performed in a case of activating the data processing apparatus 3 according to an embodiment of the present invention.

First, the BIOS 11A is activated when the data processing apparatus 3 is activated (Step S300).

Then, the validity verification program 11B is activated (Step S302). Then, the validity verification program 11B reads the secret key 11C and a validity verification signature key (not illustrated) (Step S304). Then, the validity verification program 11B combines the secret key 11C and the validity verification signature key and sets parameters for code calculation (Step S306). Then, the validity verification program 11B determines whether the parameter k is 0 (Step S308_1). The letter "k" represents a parameter that increases from 0 to N in correspondence with the number of times of performing a loop in the flow illustrated in FIG. 5. A value "0" is set as the initial value of "k". Then, in a case where the parameter k is 0, the validity verification program 11B copies the target verification data #k (=#0) into the RAM 14 (Step S308_2). Then, the validity verification program 11B instructs the code calculation engine 13 to calculate, for example, a hash value corresponding to the target verification data #0 stored in the RAM 14 in accordance with the parameters set in Step S306 (Step S308_3). Accordingly, the code calculation engine 13 performs code calculation on the copied target verification data #0. Alternatively, the copying process may be instructed to a DMA (Direct Memory Access) controller (not illustrated) instead of, for example, the CPU 10.

In a case where the parameter k is not 0, the validity verification program 11B designates target verification data #k (Step S308_4) and instructs the code calculation engine 13 to calculate, for example, a hash value corresponding to the target verification data #k in accordance with the parameters set in Step S306 (Step S308_5). Accordingly, the code calculation engine 13 performs code calculation on the designated target verification data #k.

Like a typical RAM, the RAM 14 can be accessed faster than the auxiliary storage device 12. Therefore, code calculation (validity verification) can be rapidly performed on the target verification data #0. Because code calculation is performed directly on the data stored in the auxiliary storage device 12 in a case where the target verification data is target verification data #1 or after (below), program design can be performed more flexibly.

After calculation of, for example, the hash value is completed by the code calculation engine 13 (Yes in Step S310), the validity verification program 11B determines whether the calculation result of the code calculation engine 13 and the comparison data 11D match (Step S312).

In a case where the calculation result of the code calculation engine 13 and the comparison data 11D match (Yes in Step S312), the program included in the target verification data #k is executed (Step S314).

In a case where the calculation result of the code calculation engine 13 and the comparison data 11D do not match (No in Step S312), it is determined whether the parameter k is greater than or equal to N (Step S316). In a case where the parameter k is less than N (No in Step S316), the parameter k is incremented by 1 (i.e. k+1) (Step S318). Then, the operation returns to Step S308.

In Step S314, if the target verification data #k is target verification data #0, the operating system or application program included in the target verification data #0 is activated, and the data processing apparatus 3 proceeds to a regular operation state.

Further, in Step S314, if the target verification data #k is target verification data #1 or after (below), recovery or the like of the target verification data #0 is performed. After recovery or the like of the target verification data #0 is performed, the operation system or application program included in the target verification data #0 is activated, and the data processing apparatus 3 proceeds to a regular operation state.

As described above, in a case where subordinate (subsequent) target verification data (#1, #2, . . . ) includes a program or data that are the same as those of the target verification data #0, verification is to be performed on target verification data #k+1 if the target verification data #k is invalid. This process is repeated until valid target verification data is found.

Further, if valid target verification data is found in a case where subordinate target verification data (#1, #2, . . . ) includes a program or data that are the same as those of the target verification data #0 or a recovery program of the target verification data #0, the operating system or application program is activated in addition to executing the recovery program of the target verification data #0 in the background.

That is, if any of the target verification data is valid, the data processing apparatus 3 proceeds to the regular operation state.

Therefore, the usability of the data processing apparatus 3 can be improved because the data processing apparatus 3 can automatically proceed to the regular operation state in any of the above-described cases. Further, the target verification data can easily adapt to changes of the target verification data corresponding to, for example, upgrades of software or the like because the target verification data is stored in a readable/writable auxiliary storage device 12. Thus, the usability of the data processing apparatus 3 can be improved.

In a case where the parameter k is determined to be greater than or equal to N (Yes in Step S316), an error process such as error display is performed (Step S320). Then, the flow of FIG. 5 is terminated.

Hence, the data processing apparatus 3 according to the above-described embodiment of the present invention can attain the same advantages as those of the data processing apparatus 1. In addition, the data processing apparatus 2 according to the above-described embodiment of the present invention can rapidly perform validity verification on validity verification data #0. Further, the data processing apparatus 2 according to the above-described embodiment of the present invention can perform program design more flexibly with respect to target verification data #1 or after (below).

<Fourth Embodiment>

Next, a data processing apparatus 4 according to a fourth embodiment of the present invention is described with reference to the drawings.

[Configuration]

Figure 6:
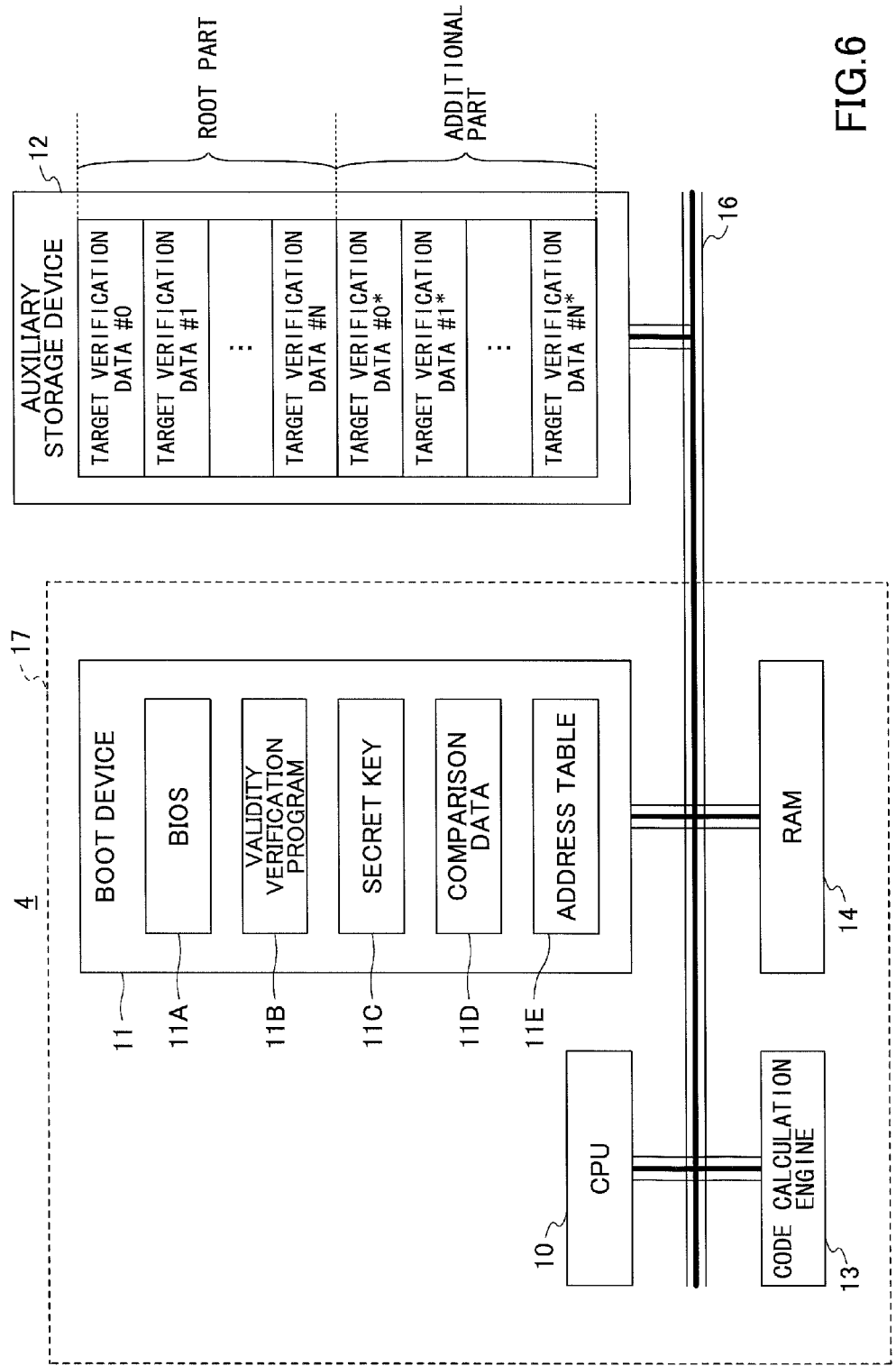
FIG. 6 is an example illustrating a system configuration of a data processing apparatus according to a fourth embodiment of the present invention.

FIG. 6 is an example illustrating a system configuration of the data processing apparatus 4 according to the fourth embodiment of the present invention. In the data processing apparatus 4 of the fourth embodiment, like components/elements are denoted by like reference numerals as those of the data processing apparatus 1 of the first embodiment and are not further explained.

Target verification data (root part of data stored in the auxiliary storage device 12, hereinafter also simply referred to as "root part") #0, #1, . . . , #N and target verification data (additional part of data stored in the auxiliary storage device 12, hereinafter also simply referred to as "additional part") #0*, #1*, . . . , #N* are stored in the auxiliary storage device 12 of the fourth embodiment.

An example of the relationship between the root part and the additional part is as follows. The basic software such as the operating system or basic application programs and the like are included in the root part whereas application programs other than the basic application programs are included in the additional part.

Accordingly, the data processing apparatus 4 of the fourth embodiment is configured to perform validity verification on the root part and, if the root part is determined to be valid (valid determination result), execute the program(s) included in the root part in addition to performing validity verification on the additional part in the background. Accordingly, with the data processing apparatus 4 of the fourth embodiment, validity verification can be quickly completed with respect to the root part including basic software such as the operating system. Accordingly, the activation time of the data processing apparatus 4 can be shortened from the standpoint of the user of the data processing apparatus 4.

It is preferable for the start and the end addresses of the target verification data (additional part) #0*, #1*, . . . , #N* to be stored in the programs or data of the root part rather than being stored in the address table 11E. That is, it is preferable for the start and the end addresses of the target verification data (additional part) #0* to be stored in the target verification data (root part) #0, the start and the end addresses of the target verification data (additional part) #1* to be stored in the target verification data (root part) #1, and the start and the end addresses of the target verification data (additional part) #N* to be stored in the target verification data (root part) #N, respectively.

Accordingly, even in a case where there is a modification (correction) of data that requires additional change of address of the target verification data (additional part) #0*, #1*, . . . , #N*, data stored in the root part need only be modified. Thus, the validity verification program 11B need only to identify the start and the end addresses of the root part by referring to, for example, the address table 11E. As a result, modification of software (e.g., upgrades) can be performed relatively freely with respect to the target verification data (additional part) #0*, #1*, . . . , #N*.

It is preferable for subordinate target verification data (root part) #1, #2, . . . to include, for example, a recovery program and the like of its superordinate target verification data (i.e. target verification data (root part) having a higher order than the subordinate target verification data #1, #2, . . . (root part)) and preferable for subordinate target verification data (additional part) #1, #2, . . . to include, for example, a recovery program and the like of its superordinate target verification data (i.e. target verification data (additional part) having a higher order than the subordinate target verification data #1, #2, . . . (additional part)). This also applies to the above-described first, second, and third embodiments.

[Procedure of Validity Verification]

Figure 7:
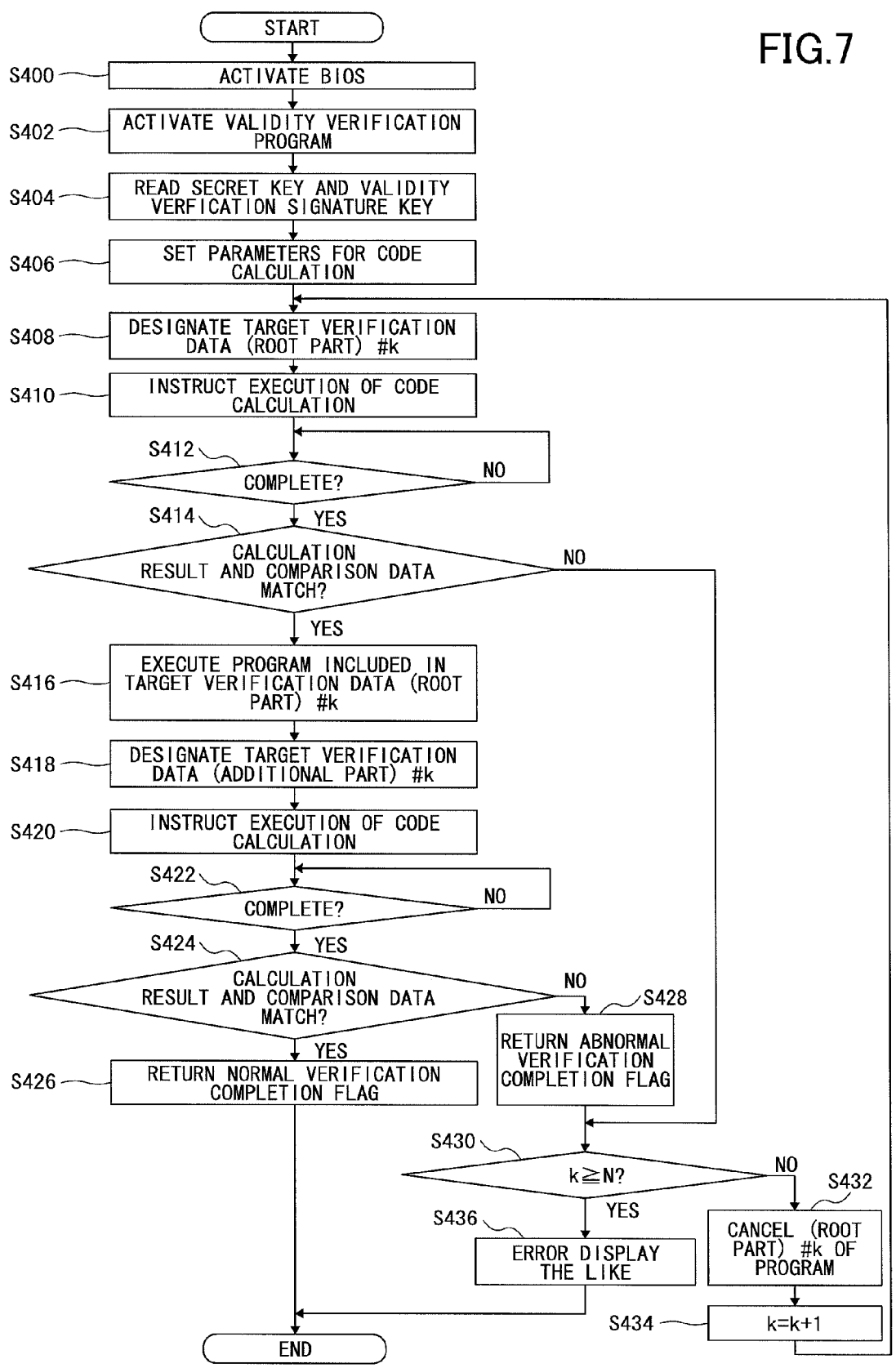
FIG. 7 is a flowchart illustrating the flow of an operation performed in a case of activating the data processing apparatus according to the fourth embodiment of the present invention.

FIG. 7 is a flowchart illustrating the flow of an operation performed in a case of activating the data processing apparatus 4 according to an embodiment of the present invention.

First, the BIOS 11A is activated when the data processing apparatus 4 is activated (Step S400).

Then, the validity verification program 11B is activated (Step S402). Then, the validity verification program 11B reads the secret key 11C and the validity verification signature key (not illustrated) (Step S404). Then, the validity verification program 11B combines the secret key 11C and the validity verification signature key and sets parameters for code calculation (Step S406).

Then, the validity verification program 11B designates target verification data (root part) #k (Step S408) and instructs the code calculation engine 13 to calculate, for example, a hash value corresponding to the target verification data (root part) #k in accordance with the parameters set in Step S406 (Step S410). The letter "k" represents a parameter that increases from 0 to N in correspondence with the number of times of performing a loop in the flow illustrated in FIG. 7. A value "0" is set as the initial value of "k".

In a case where the calculation by the code calculation engine 13 is completed (Yes in Step S412), the validity verification program 11B determines whether the calculation result of the code calculation engine 13 and the comparison data 11D match (Step S414).

In a case where the calculation result of the code calculation engine 13 and the comparison data 11D match (Yes in Step S414), the program included in the target verification data (root part) #k is executed (Step S416).

In Step S416, if the target verification data (root part) #k designated in Step S408 is target verification data (root part) #0, basic software such as the operation system included in the target verification data (root part) #0 is activated. Further, in a case where the target verification data (root part) #k is target verification data (root part) #1 or after (below), recovery or the like of the target verification data (root part) #0 is performed. After recovery or the like of the target verification data (root part) #0 is performed, basic software such as the operating system included in the target verification data (root part) #0 is activated.

As described above, in a case where subordinate (subsequent) target verification data (root part) (#1, #2, . . . ) includes a program or data that are the same as those of the target verification data (root part) #0, verification is to be performed on target verification data (root part) #k+1 if the target verification data (root part) #k is invalid. This process is repeated until valid target verification data (root part) is found.

Further, if valid target verification data (root part) is found in a case where subordinate target verification data (root part) (#1, #2, . . . ) includes a program or data that are the same as those of the target verification data (root part) #0 or a recovery program of the target verification data (root part) #0, basic software such as the operating system is activated in addition to executing the recovery program of the target verification data (root part) #0 in the background.

That is, if any of the target verification data (root part) is valid, the data processing apparatus 4 activates its basic software such as the operating system. As a result, the user can use basic functions of the data processing apparatus 4.

Then, a program included in the target verification data (root part) #k designates target verification data (additional part) #k* (Step S418) and instructs the code calculation engine 13 to calculate, for example, a hash value corresponding to the target verification data (additional part) #k* in accordance with the parameters set in, for example, Step S406 (Step S420).

In a case where the calculation by the code calculation engine 13 is completed (Yes in Step S422), the program included in the target verification data (root part) #k determines whether the calculation result of the code calculation engine 13 and the comparison data 11D match (Step S424).

In a case where the calculation result of the code calculation engine 13 and the comparison data 11D match (Yes in Step S424), the program included in the target verification data (root part) #k returns a normal verification completion flag (flag indicating that validity verification has been completed without abnormality) to the validity verification program (Step S426). When the validity verification program 11B receives the normal verification completion flag, the validity verification program 11B terminates the flow of FIG. 7. Then, the data processing apparatus 4 proceeds to a regular operation state.

In a case where the calculation result of the code calculation engine 13 and the comparison data 11D match, no particular process is performed if the target verification data (additional part) #k* is target verification data (additional part) #0* whereas a recovery program of a superordinate target verification data (additional part) (compared to the target verification data (additional part) #k*) is executed in the background if the target verification data (additional part) #k* is target verification data (additional part) #1* or after (below).

In a case where the calculation result of the code calculation engine 13 and the comparison data 11D do not match (No in Step S424), the program included in the target verification data (root part) #k returns an abnormal verification completion flag (flag indicating that validity verification has been completed with abnormality) to the validity verification program (Step S428). When the validity verification program 11B receives the abnormal verification completion flag, the validity verification program 11B determines whether the parameter k is greater than or equal to N (Step S430). In a case where the parameter k is less than N (No in Step S430), the validity verification program 11B stops (cancels) the program included in the target verification data (root part) #k (Step S432) and increments the parameter k with 1 (i.e. k+1) (Step S434). Then, the operation returns to Step S408.

Likewise, in a case where the validity verification program 11B determines that the code calculation engine 13 and the comparison data 11D do not match (No in Step S414), the validity verification program 11B determines whether the parameter k is greater than or equal to N (Step S430). In a case where the parameter k is less than N (No in Step S430), the validity verification program 11B stops (cancels) the program included in the target verification data (root part) #k (Step S432) and increments the parameter k by 1 (i.e. k+1) (Step S434). Then, the operation returns to Step S408.

Accordingly, until both the target validity data (root part) #k and the target validity data (additional part) #k* are determined to be valid, the parameter k is incremented and the processes in Steps S408-S434 of FIG. 7 are repeated. Accordingly, if any of the target verification data is valid, the data processing apparatus 4 proceeds to the regular operation state. Thus, similar to the data processing apparatus 1 of the first embodiment, the usability of the data processing apparatus 4 can be improved.

In a case where the parameter k is determined to be greater than or equal to N (Yes in Step S430), an error process such as error display is performed (Step S436). Then, the flow of FIG. 7 is terminated.

Hence, the data processing apparatus 4 according to the above-described embodiment of the present invention can attain the same advantages as those of the data processing apparatus 1. In addition, because the data processing apparatus 4 according to the above-described embodiment of the present invention can rapidly perform validity verification on the root part including basic software such as the operating system, the activation time of the data processing apparatus 4 can be shortened from the standpoint of the user of the data processing apparatus 4.

By storing the start and the end addresses of the target verification data (additional part) in a program or data of the root part, the modification of software (e.g., upgrades) can be performed relatively freely with respect to the additional part.

According to the fourth embodiment, whether to copy the target verification data (on which code calculation is performed) into the RAM 14 can be arbitrarily determined. That is, the target verification data (on which code calculation is performed) may be copied into the RAM 14.

Figure 8:
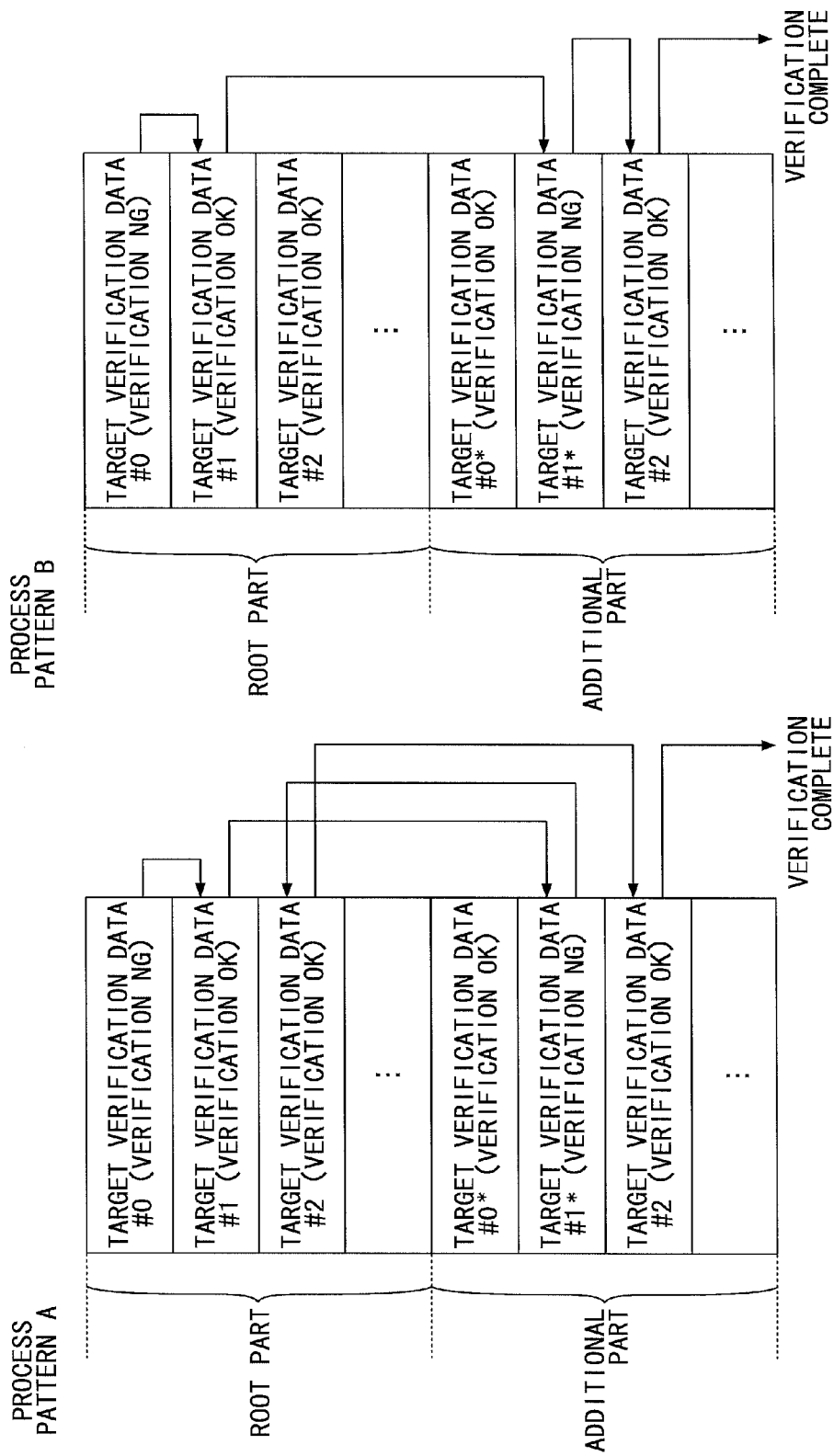
FIG. 8 is a schematic diagram for describing a variation of the operation of the fourth embodiment of the present invention.

Further, according to the flow of the operation performed by the data processing apparatus 4 of the fourth embodiment, in a case where target verification data (additional part) #k* is determined to be invalid, validity verification is performed on target verification data (root part) #k+1 (see Process pattern A of FIG. 8). Alternatively, if the target verification data (additional part) #k* is invalid, validity verification may then be performed on target verification data (additional part) #k* in view that the target verification data (root part) #k is already determined to be valid (see Process pattern B of FIG. 8). In a case of Process pattern B, it is preferable for the start and the end addresses of each of the target verification data #k*, #k+1*, . . . #N* to be stored in the target verification data (root part) #k. FIG. 8 illustrates the Process patterns A and B for comparison. The process patterns A and B are variations of the operation performed by the data processing apparatus 4 of the fourth embodiment. The arrows illustrated in FIG. 8 indicate the transitions of validity verification of the process patterns A and B. "Verification OK" indicates that the result of verification is valid, and "verification NG" indicates that the result of verification is invalid.

<Fifth Embodiment>

Next, a data processing apparatus 5 according to a fifth embodiment of the present invention is described with reference to the drawings.

[Configuration]

Figure 9:
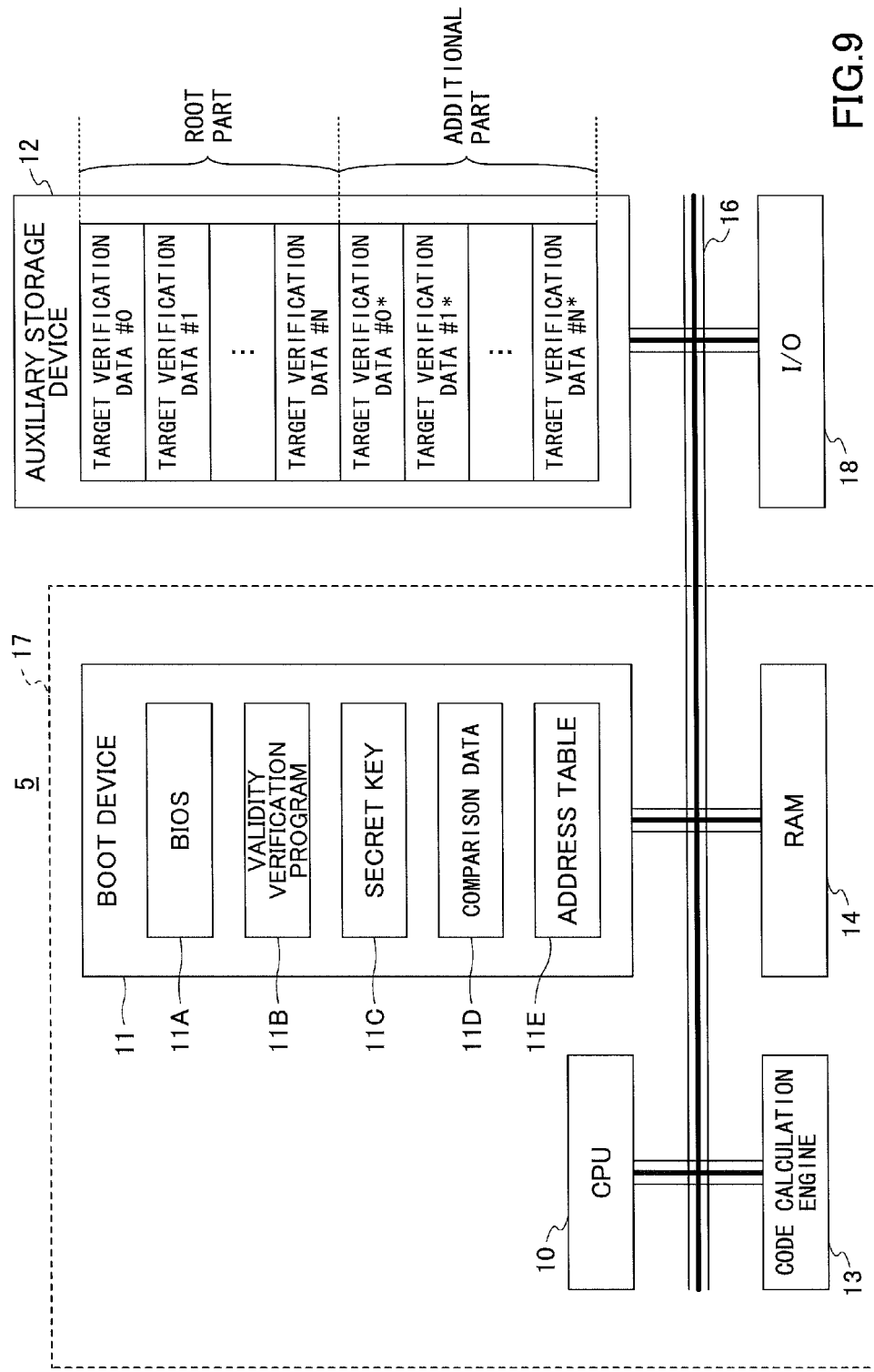
FIG. 9 is an example illustrating a system configuration of a data processing apparatus according to a fifth embodiment of the present invention.

FIG. 9 is an example illustrating a system configuration of the data processing apparatus 5 according to the fifth embodiment of the present invention. In the data processing apparatus 5 of the fifth embodiment, like components/elements are denoted by like reference numerals as those of the data processing apparatus 4 of the fourth embodiment and are not further explained.

The data processing apparatus 5 includes an I/O (Input/Output) device 18. Although not described in the first-fourth embodiments, an I/O device may also be included in the data processing apparatuses 1-4 of the first-fourth embodiments.

In the data processing apparatus 5 of the fifth embodiment, the target verification data has a control program for recovery stored therein but does not have all of the recovery programs of its superordinate target verification data stored therein. Thus, with the data processing apparatus 5 of the fifth embodiment, data is read from a device connected to the I/O device 18 and overwritten in the auxiliary storage device 12 by way of, for example, the CPU 10. In a case where the I/O device 18 is not connected to a recording medium or the like on which corresponding target data (e.g., recovery program) is recorded, a message urging the user to connect the recording medium or the like to the I/O device 18 may be displayed on, for example, a display device or the like. In a case where the I/O device 18 is connected to the recording medium or the like, the reading of the recovery program or the overwriting of the auxiliary storage device 12 may be started automatically or started upon receiving approval from the user.

The device or recording medium connected to the I/O device 18 may be, for example, a SD (Secure Digital) card, a floppy disk (registered trademark), a USB (Universal Serial Bus) memory, a CD (Compact Disc), a DVD (Digital Versatile Disc), or an interface device connected to a wired/wireless network.

Thereby, the time for activating basis software such as the operating system can be reduced. Further, size of target verification data (particularly, target verification data #1 or after (below)) to be stored beforehand in the auxiliary storage device 12 can be reduced. Further, because a recovery program or the like is externally stored (outside the data processing apparatus 5), modification (e.g., upgrades) of the software in the data processing apparatus 5 can be performed flexibly.

[Procedure of Validity Verification]

Because the procedure of validity verification of the fifth embodiment is basically the same as the procedure of validity verification of the fourth embodiment illustrated in FIG. 7, a flowchart illustrating the flow of the procedure of validity verification of the fifth embodiment and a description of the flow are not further explained. In the fifth embodiment, in the process of Step S416 of FIG. 7, recovery is not performed for all of the superordinate target verification data (root part) but a process of reading a recovery program or the like from a device connected to the I/O device 18 and overwriting the recovery program or the like into the auxiliary storage device 12 is performed. Likewise, after the process of Step S426 of FIG. 7, recovery is not performed for all of the superordinate target verification data (additional part) but a process of reading a recovery program or the like from a device connected to the I/O device 18 and overwriting the recovery program or the like into the auxiliary storage device 12 is performed.

Figure 10:
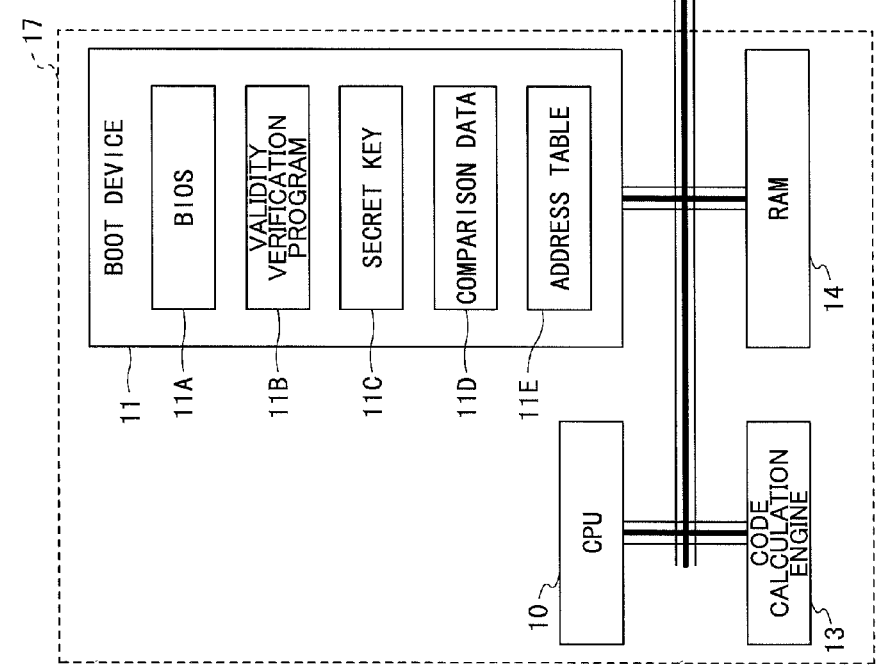
FIG. 10 is a schematic diagram illustrating a state where a program is executed after target verification data (root part) #2 is determined to be valid according to the result of validity verification according to an embodiment of the present invention.

FIG. 10 is a schematic diagram illustrating a state where a program is executed after target verification data (root part) #2 is determined to be valid according to the result of validity verification. In this state, the execution of the program of the target verification data (root part) #2 causes basic software such as the operating system to be activated and causes a recovery program of the target verification data (root part) #1 to be read from the I/O device 18 and overwritten into the auxiliary storage device 12. Then, after this state, validity verification is performed on the target verification data (additional part) #2. In a case where the target verification data (additional part) #2 is determined to be valid, the recovery program of the target verification data (additional part) #0 is read from the I/O device 18 and overwritten into the auxiliary storage device 12. Alternatively, the process of reading the recovery program of the target verification data (additional part) #0 and the process of reading the recovery program of the target verification data (root part) #1 may be performed in parallel.

The principles of the operation of the fifth embodiment may also be applied to the first-third embodiments. That is, even in a case where target verification data is not divided into a root part and an additional part, a recovery program or the like is read from a device connected to the I/O device 18 and overwritten into the auxiliary storage device instead of executing recovery for all of the superordinate target verification data of the target verification data.

In a case of executing a program included in target verification data after determining that the target verification data (root part) is valid, the program may be loaded in the RAM 14 and executed. Similar to FIG. 10, FIG. 11 illustrates a state where the program included in the target verification data (root part) #2 is loaded to the RAM 14 and executed. Thereby, even in a case where the auxiliary storage device 12 is unable to execute programs and overwrite programs substantially simultaneously, the program included in the target verification data can be executed by the RAM 14.

Hence, the data processing apparatus 5 according to the above-described embodiment of the present invention can attain the same advantages as those of the data processing apparatus 1. In addition, the data size of the target verification data stored beforehand in the auxiliary storage device 12 can be reduced. Further, by using a configuration where a recovery program or the like is externally stored (outside the data processing apparatus 5), modification (e.g., upgrades) of software can be flexibly performed.

MODIFIED EXAMPLES

The present invention is not limited to the specifically disclosed embodiments, and variations and modifications may be made without departing from the scope of the present invention.

For example, components/elements of the configuration of the data processing apparatus 1-5 and processes performed by the components/elements of the configuration may be discretionarily combined with each other.

Further, the code calculation engine 13 may be omitted from any one of the above-described embodiments of the data processing apparatuses 1-5 and replaced with the CPU 10 for performing code calculation.

The present application is based on Japanese Priority Application No. 2011-222617 filed on Oct. 7, 2011 with the Japanese Patent Office, the entire contents of which are hereby incorporated herein by reference.

What is claimed is:

1. A data processing apparatus comprising:
a ROM (Read Only Memory) having a validity verification program stored therein;
an auxiliary storage device including a plurality of storage areas having a plurality of target verification data stored therein;
an execution unit configured to perform a validity verification process on the plural target verification data in accordance with the validity verification program;
wherein an order of priority is assigned to the plural target verification data, wherein the plural storage areas have addresses that is recognizable by the execution unit, wherein the execution unit is configured to determine validity of each of the plural target verification data based on the order of priority until one of the plural target verification data is determined to be valid, wherein the plural target verification data includes superordinate target verification data and subordinate target verification data having the order of priority that is lower than the order of priority of the superordinate target verification data, wherein the subordinate target verification data does not include a target verification data having the highest order of priority among the plural target verification data, wherein the auxiliary storage device is configured to have a recovery program of the superordinate target verification data stored in at least one of the subordinate target verification data, wherein the ROM and the execution unit constitute a configuration of a SoC (System-on-a-Chip) or a configuration of a ASIC (Application Specific Integrated Circuit).

2. The data processing apparatus as claimed in claim 1, wherein the auxiliary storage device is configured to have the plural target verification data arranged in accordance with the order of priority, wherein the addresses of the plural storage areas include physical addresses of the auxiliary storage device that correspond to the plural target verification data.

3. The data processing apparatus as claimed in claim 1, further comprising:

a RAM (Random Access Memory) into which the plural target verification data are copied by the execution unit;

wherein the execution unit is configured to perform the validity verification process on the plural target verification data copied into the RAM.

4. The data processing apparatus as claimed in claim 1, further comprising:

a RAM (Random Access Memory) into which a target verification data having the highest order of priority among the plural target verification data is copied by the execution unit;

wherein the execution unit is configured to perform the validity verification process on the target verification data having the highest order of priority that has been copied into RAM, wherein the execution unit is configured to perform the validity verification process on the plural target verification data other than the target verification data having the highest order of priority.

5. The data processing apparatus as claimed in claim 1, wherein each of the plural target verification data has a root part including data pertaining to an operating system and an additional part including data pertaining to an application program, wherein in a case where the execution unit determines that the root part of one of the plural target verification data is valid, the execution unit is configured to perform the validity verification process on the additional part of the one of the plural target verification data having the same order of priority as the root part of the one of plural target verification data after the root part of the one of the plural target verification data is activated.

6. The data processing apparatus as claimed in claim 5, wherein the auxiliary storage device is configured to have a program stored in the root part of the one of the plural target verification data for performing the validity verification process on at least a part of the additional part of the one of the plural target verification data, wherein the program includes an address of the additional part of the one of the plural target verification data having the same order of priority as the root part of the one of plural target verification data, wherein the address is recognizable by the execution unit.

7. The data processing apparatus as claimed in claim 5, wherein in a case where the execution unit determines that an additional part of a given target verification data is invalid, the execution unit is configured to perform the validity verification process on a root part of a target verification data having the order of priority that is one level lower than the order of priority of the given target verification data.

8. The data processing apparatus as claimed in claim 5, wherein in a case where the execution unit determines that an additional part of a given target verification data is invalid, the execution unit is configured to perform the validity verification process on an additional part of a target verification data having the order of priority that is one level lower than the order of priority of the given target verification data.

9. The data processing apparatus as claimed in claim 1, further comprising:

an I/O (input/output) device configured to read a recovery program of a superordinate target verification data included in the plural target verification data, the superordinate target verification data having the order of priority that is higher than the order of priority of a subordinate target verification data included in the plural target verification data;

wherein the auxiliary storage device is configured to have a control program stored in one or more of the plural target verification data other than the plural target verification data having the highest order of priority, the control program causing the causing the I/O device to read the recovery program from the external device.

10. The data processing apparatus as claimed in claim 9, further comprising a RAM (Random Access Memory);

wherein the execution unit is configured to load the control program in the RAM and execute the control program.

11. A method for executing a validity verification process on a plurality of target verification data stored in a plurality of storage areas of an auxiliary storage device of a data processing apparatus that includes a ROM (Read Only Memory) and an execution unit, the method comprising the steps of:

designating one of the plural target verification data in accordance with an order of priority assigned to the plural target verification data; and executing, by way of the execution unit, the validity verification process on the designated one of the plural target verification data;

wherein the executing of the validity verification process includes determining whether the designated one of the plural target verification data is valid, wherein the executing of the validity verification process is repeated until the designated one of the plural target verification data is determined to be valid, wherein the plural target verification data includes superordinate target verification data and subordinate target verification data having the order of priority that is lower than the order of priority of the superordinate target verification data, wherein the subordinate target verification data does not include a target verification data having the highest order of priority among the plural target verification data, wherein the auxiliary storage device is configured to have a recovery program of the superordinate target verification data stored in at least one of the subordinate target verification data, wherein the ROM and the execution unit constitute a configuration of a SoC (System-on-a-Chip) or a configuration of a ASIC (Application Specific Integrated Circuit).

* * * * *